(12) United States Patent
Tumlin

(10) Patent No.: US 7,155,987 B1
(45) Date of Patent: *Jan. 2, 2007

(54) METHOD AND APPARATUS FOR TESTING THE STRUCTURAL INTEGRITY OF OFFSHORE LIFTING CONTAINERS

(76) Inventor: David M. Tumlin, 1037 Jolie Blonde Rd., Breaux Bridge, LA (US) 70517

( * ) Notice: Subject to any disclaimer, the term of this patent is extended or adjusted under 35 U.S.C. 154(b) by 42 days.

This patent is subject to a terminal disclaimer.

(21) Appl. No.: 11/165,419

(22) Filed: Jun. 22, 2005

Related U.S. Application Data

(63) Continuation-in-part of application No. 10/715,321, filed on Nov. 14, 2003, now Pat. No. 6,935,196.

(51) Int. Cl.
*G01L 1/26* (2006.01)

(52) U.S. Cl. .................................. 73/862.393
(58) Field of Classification Search ........... 73/862.393, 73/862.392, 862.391, 788, 862.621, 862.62; 248/123.11

See application file for complete search history.

(56) References Cited

U.S. PATENT DOCUMENTS

| | | | |
|---|---|---|---|
| 4,884,454 A | * | 12/1989 | Johnson ....................... 73/788 |
| 5,561,931 A | | 10/1996 | Duenkel |
| 6,332,364 B1 | * | 12/2001 | Buschmann et al. .......... 73/788 |
| 6,494,103 B1 | | 12/2002 | Loong |
| 6,637,274 B1 | * | 10/2003 | Metelski ....................... 73/788 |
| 6,935,196 B1 | * | 8/2005 | Tumlin .................. 73/862.393 |

* cited by examiner

*Primary Examiner*—Jewel Thompson
(74) *Attorney, Agent, or Firm*—Robert N. Montgomery

(57) ABSTRACT

An apparatus and method for load testing lifting containers and their related cable slings using a hydraulic jacking arrangement located within the container itself for equalized stress loading of the container and its cable slings and lifting eyes or points under various prescribed conditions. The apparatus being portable and expandable to accommodate various size containers, applies isometric loading throughout the structural containment without lifting the container off the deck or inducing external heavy loads. The jacking arrangement includes a structural frame assembly including adjustable frame legs or vertical columns, an optional extendable screw jack and a hydraulic ram to which cable slings are attached. Actuating the hydraulic ram applies tension to the cable slings and simultaneously to the frame legs or vertical columns straddling the container and inserted within the forklift slots or openings of the container skid in an opposing manner.

26 Claims, 14 Drawing Sheets

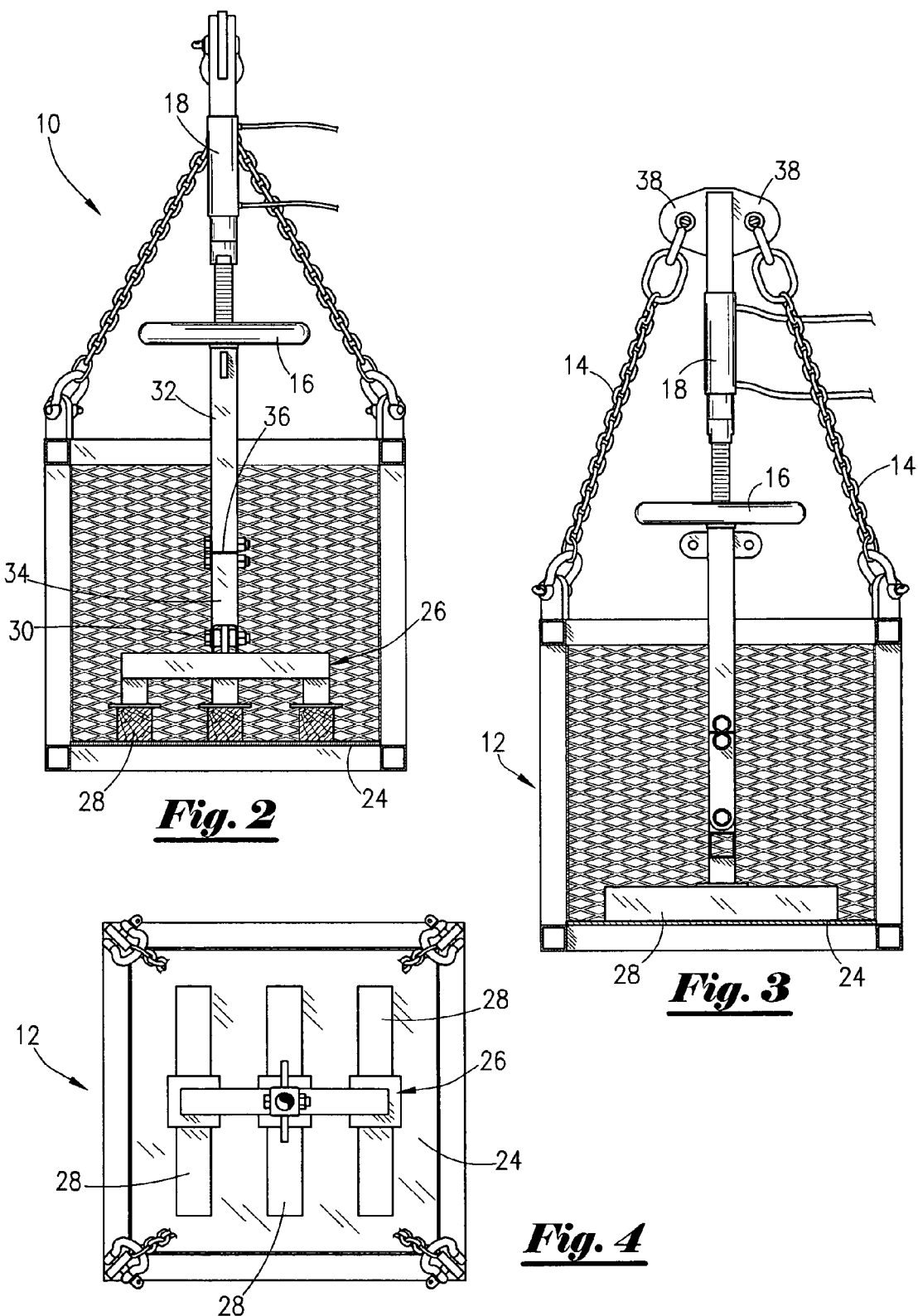

METHOD AND APPARATUS FOR TESTING THE STRUCTURAL INTEGRITY OF OFFSHORE LIFTING CONTAINERS

1. FIELD OF THE INVENTION

This is a continuation-in-part of my previous application Ser. No. 10/715,321 filed Nov. 14, 2003 now U.S. Pat. No. 6,935,196. This invention relates generally to methods and test apparatus used in certification and periodic testing of offshore lifting containers and their associated lifting slings, the lifting attachments and structural integrity of equipment skids and more particularly to the certification and periodic load testing of such skid lifting means and industry approved lifting containers generally used for lifting materials and loose equipment to and from supply vessels by offshore drilling rigs.

2. GENERAL BACKGROUND

Freight containers and the more relevant common offshore equipment containers and skid-mounted equipment discussed herein are subject to international convention rules governing their construction and periodic safety inspection. Such offshore containers and skid units are generally rectangular, vary in length from ten to over forty feet, and are constructed of heavy steel tubular members in some cases with expanded metal decking. The containers and skids are also equipped in some cases with their own cable slings or rigging such as spreader bars etc. These containers and skids and their lifting slings must be examined and certified when new, re-inspected every 6 months and pass a proof load test of up to two and one-half times their safe working load under various conditions every 24 months. With safe working loads of these containers reaching 24 tons or more, the testing apparatus is often quite large and heavy itself. Therefore, most testing is conducted at onshore facilities. This requires that the containers or equipment skids be transported great distances to these facilities at significant expense plus taking the containers or equipment skids out of service for long periods of time, incurring even greater expense.

Recently, methods have been devised for carrying out the required load test on site locations such as the offshore rig itself or in near vicinity to the supply point utilizing the equipment skids or containers. Such methods include water bag weights. This allows for easy storage but requires a great deal of time to set up and fill the bags. Movement of the offshore rig produces an unstable platform and thus tends to overload some areas of the container more than others, producing an imprecise test. Further, such testing requires that the container be lifted off the deck with the water bags in place producing a potentially unsafe situation if the load shifts for any reason.

3. SUMMARY OF THE INVENTION

The invention disclosed herein provides an apparatus and method for load testing lifting containers and equipment skids as well as their related rigging, such as cable slings spreader frames etc., using a hydraulic jacking arrangement located integral with the equipment skid unit or within the container itself for equal stress loading of the skid or container and its skid framing, cable slings and lifting eyes or points under various prescribed conditions. The apparatus, being portable and expandable to accommodate various size equipment skids or containers, applies isometric loading throughout the structural containment without lifting the skid unit or container off the deck or inducing external heavy loads. The jacking arrangement may include extension legs and feet, extendable screw jack, and a hydraulic ram to which the container's cable or flexible or chain slings are attached. Actuating the hydraulic ram applies tension to the cable or flexible or chain slings and simultaneously to the legs and feet located at strategic points on the skid or floor of the container.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 2 is a partial cross-sectional side elevation view of the embodiment illustrated in FIG. 1;

FIG. 3 is a cross-sectional front elevation view of the embodiment illustrated in FIG. 1;

FIG. 4 is a top view of the embodiment illustrated in FIG. 1;

5. DETAILED DESCRIPTION OF THE PREFERRED EMBODIMENT

Figure 1:
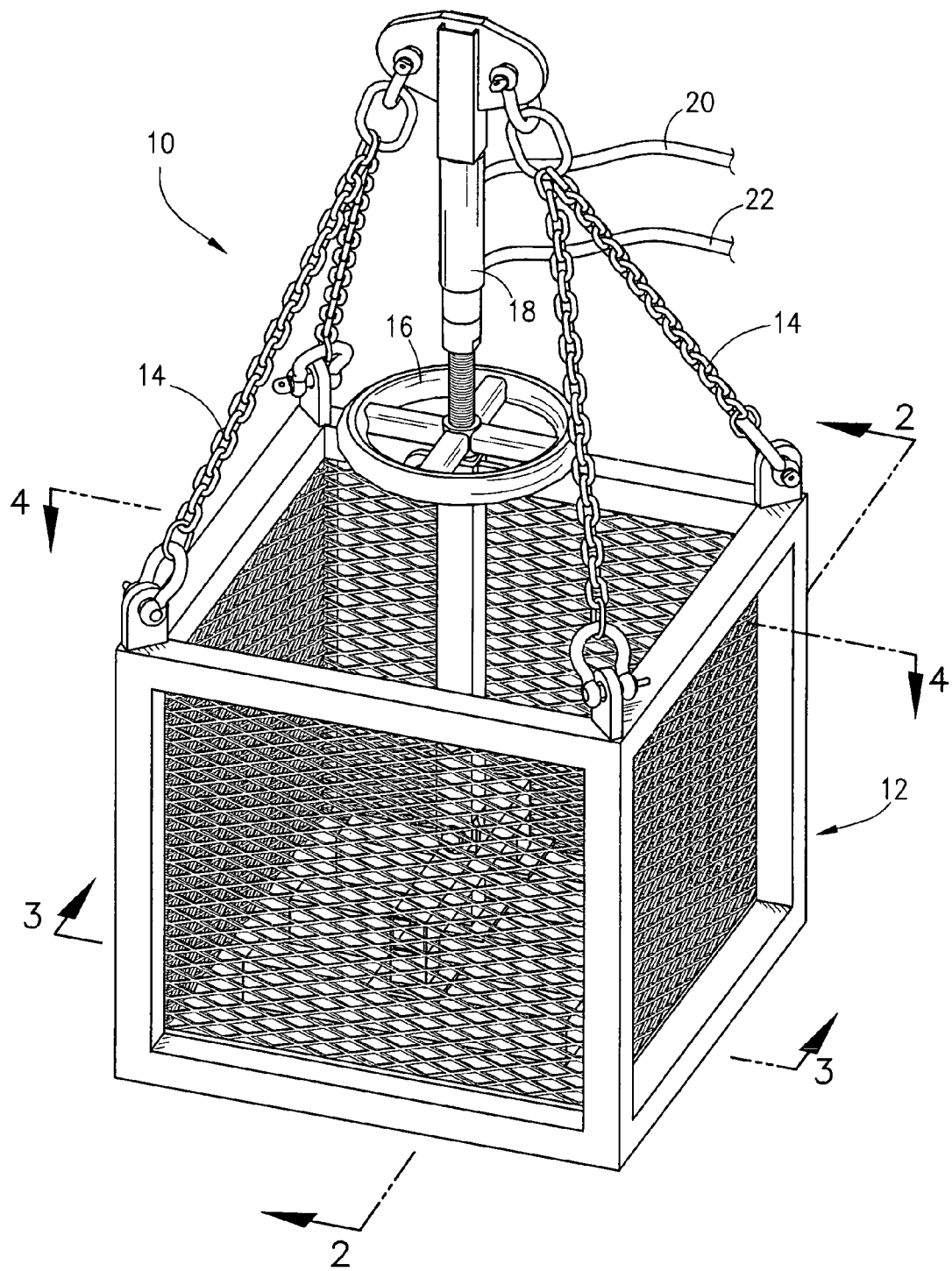
FIG. 1 is an isometric view of the tensioning apparatus in its simplest form.

As first seen in the assembly illustrated in FIG. 1, the test apparatus 10 is inserted into a container 12 to be tested and connected to the container's slings 14. Initial tension is then applied to the slings 14 by rotation of the tension wheel 16. Hydraulic fluid pressure supplied by a hydraulic pump system is then applied to the hydraulic linear actuator assembly 18 via hydraulic line 20, thereby further applying downward force to the floor of the container. Pressure is then adjusted to the prescribed related test loading for the particular size container 12 being tested. Pressure may then be released by removing pressure on hydraulic line 20 and applying pressure to the head end of the actuator assembly 18 via hydraulic line 22.

It should be noted that although many types of open cargo containers are used for transferring cargo in offshore environments, the container shown in FIG. 1 utilizing tubular frame construction lined with expanded metal to allow for water drainage is most often the container of choice. However, the test apparatus 10 may be used successfully on many other types of containers in a variety of configurations.

As further seen in FIG. 2 the test apparatus is supported upon the container floor 24 by a footing assembly 26 resting on wooden beams 28 strategically placed so as to equalize point loading of the feet across the surface of the container floor 24 including any container support members thereof. The footing assembly 26 is pivotally connected to the test apparatus 10 by a clevis arrangement 30. A lower column portion 32 of the test apparatus 10 being rotatively extendable relative to the hydraulic actuator 18 is also extendable by adding additional lengths of tubing between the column 32 and pivot member 34 pined at joint 36.

As seen in FIG. 3 the slings 14 are connected to pad eyes 38 attached to the blind end of the hydraulic actuator 18. It can also be seen that the wooden beams 28 extend horizontally at least ⅔ of the width of the container floor 24.

As shown in FIG. 4 the three feet of footing 26 are centrally located on the wooden beams 28 and spaced so that the concentrated force produced by the hydraulic cylinder is distributed equally across the container floor 24.

Figure 5:
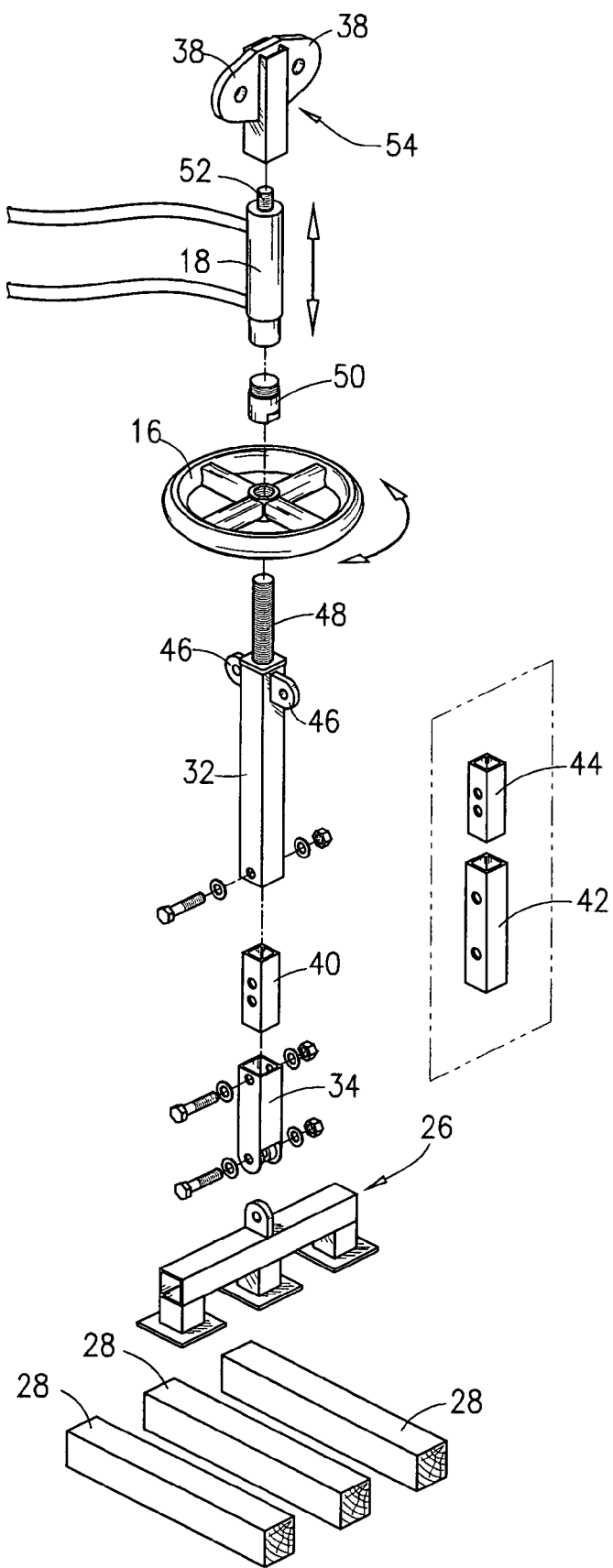
FIG. 5 is an exploded view of the tensioning mechanism illustrated in FIG. 1.

The nomenclature of the apparatus as better seen in FIG. 5 includes wooden beams 28 which may be cut to fit any desired container length, the foot assembly 26 the clevis column member 34, internal stub member 40, additional optional lengths of column tubing 42, additional stub members 44 as needed to extend the column 32 which also include pad eyes 46 and threaded rod 48, hand wheel 16 cylinder adapter head 50 hydraulic actuator 18 which includes threaded portion 52 and the column head member assembly 54, attached to the blind end of the pressure operated linear actuator 18, which includes the pad eyes 38.

Figure 6A:
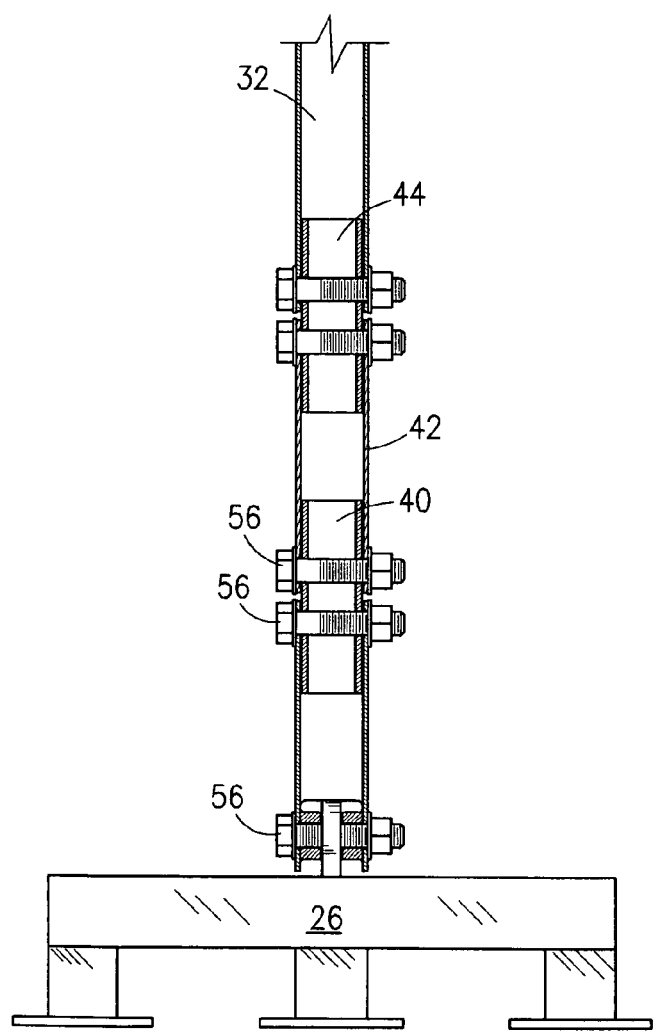
FIG. 6A is a cross-section view of the tensioning mechanism illustrated in FIG. 5.
Figure 6B:
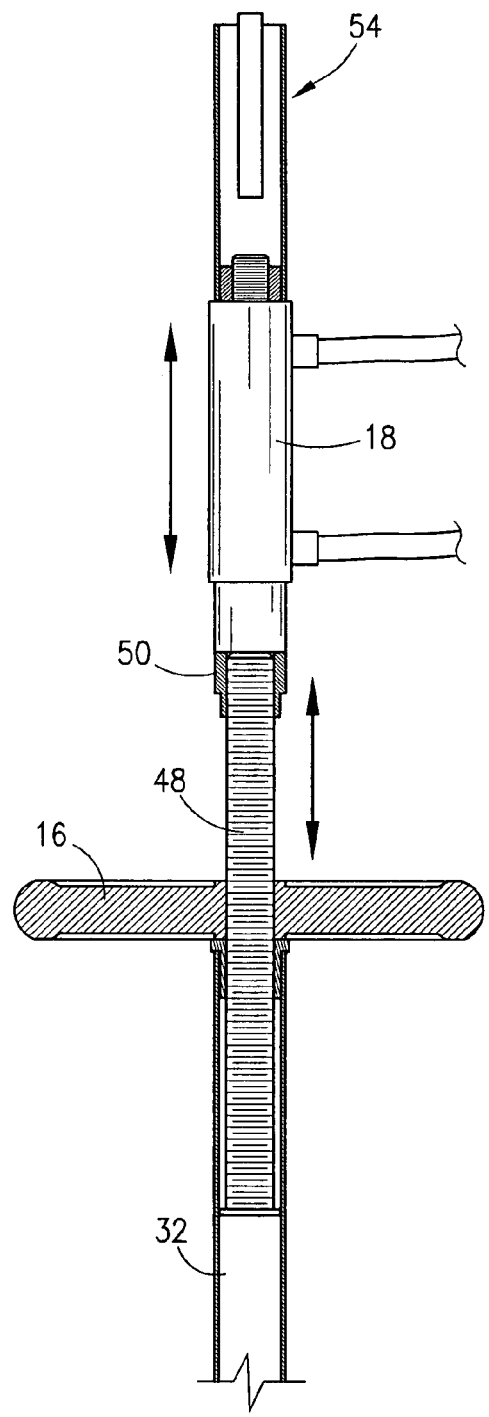
FIG. 6B is a continuation of the cross-section view of the tensioning mechanism illustrated in FIG. 6A.

As seen in FIG. 6A the above-mentioned column and foot members 80, 78 are connected with fasteners 56. As seen in FIG. 6B the threaded rod member 48 is threadably engaged with the hand wheel 16 and slidably inserted into the column member 32, the opposite end of which is threadably attached to the rod end of the pressure operated actuator 18, preferably a hydraulically operated cylinder, by adaptor 50. Rotating the hand wheel 16 extends or retracts the threaded rod 48 from within the tubular column 32, thus manually extending or retracting the vertical length of the column assembly.

Figure 7:
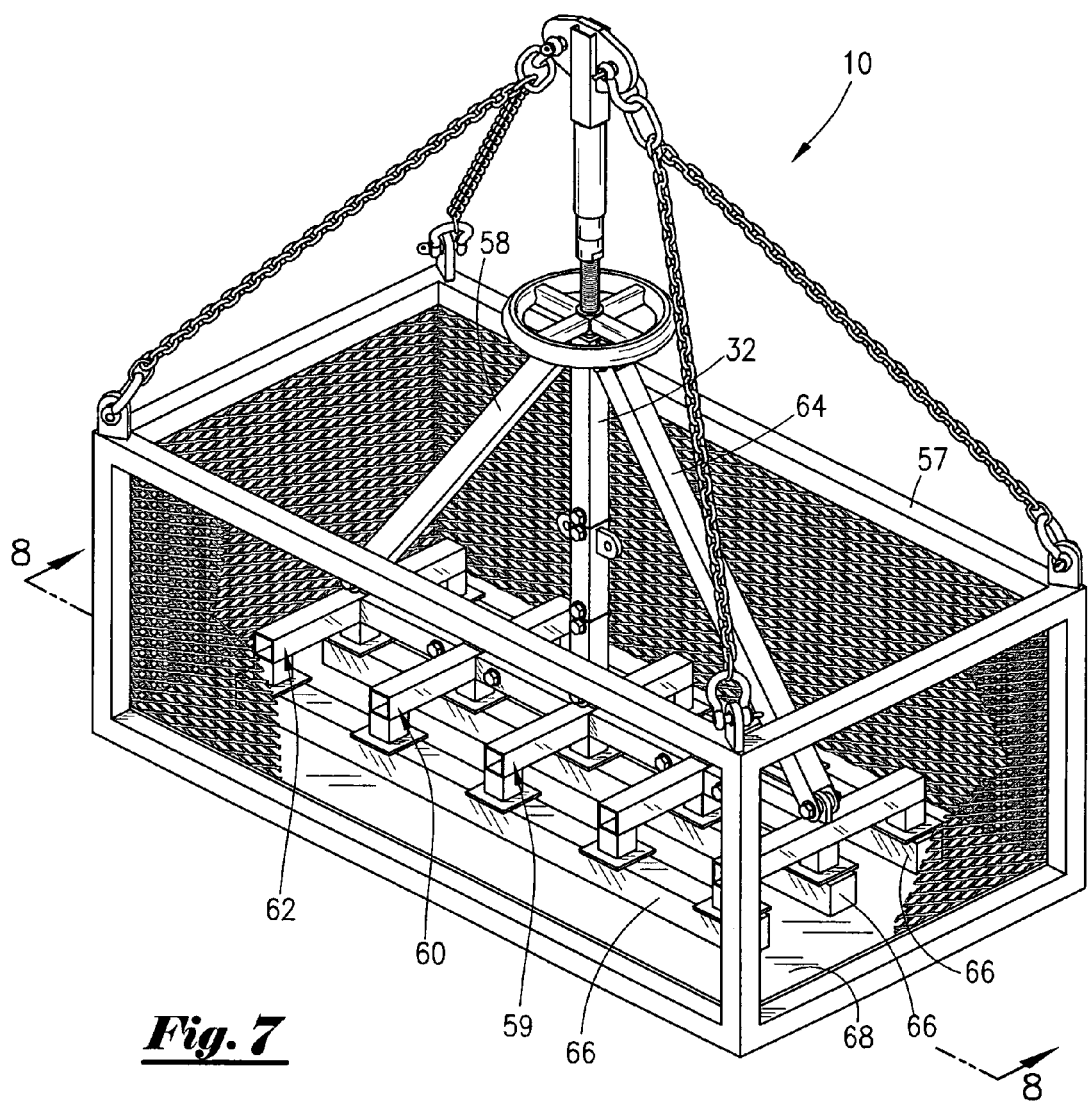
FIG. 7 is an isometric view of a second embodiment with adaptive tension frame legs or vertical columns for a larger container.
Figure 8:
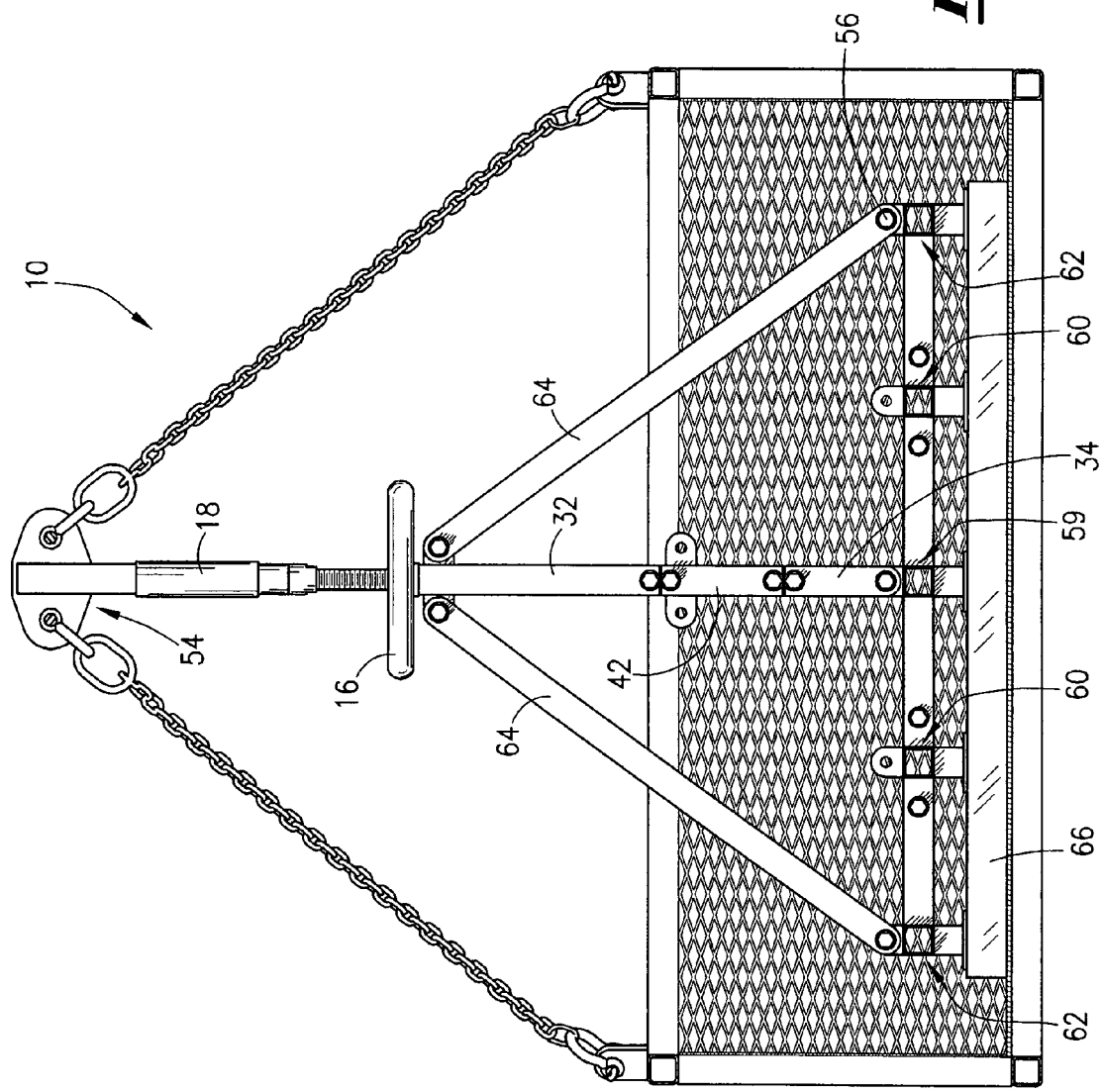
FIG. 8 is a is a partial cross-sectional side elevation view of the embodiment illustrated in FIG. 7.
Figure 11:
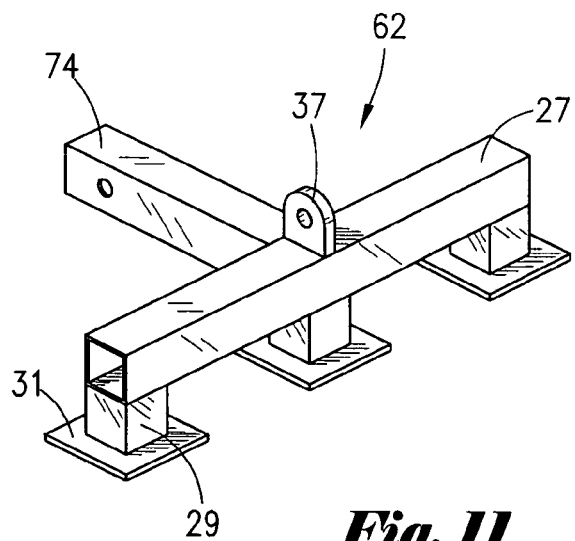
FIG. 11 is a partial isometric view of the end foot assembly.

As seen in FIG. 7 the apparatus 10 may be extended to accommodate a larger container 57 by adding more foot assemblies 59, 60 and 62 adapted for interconnection with each other and braced back to the column 32 with trusses or braces 64. In this case the wooden beams 66 extend longitudinally along the interior floor 68 of the container 57. Since the longer containers require longer slings, the column assembly 32 must also be extended using the optional lengths of column tubing 42 and additional stub members 44 as better seen in FIG. 8. In this case the foot assemblies 59, 60, 62 are arranged with the central foot assembly 59 being connected to end foot assemblies 62 by adaptor foot assemblies 60 located either side of the column members 32,42, 34. As seen in FIG. 11 end foot assemblies 62 are fitted with a cooperative pad eye 37 for pivotally connecting the leg braces or trusses 64 which are in turn pivotally connected to the column pad eyes 46 best seen in FIG. 5. Again the assemblies are pinned with fasteners 56 at all joints.

Figure 9:
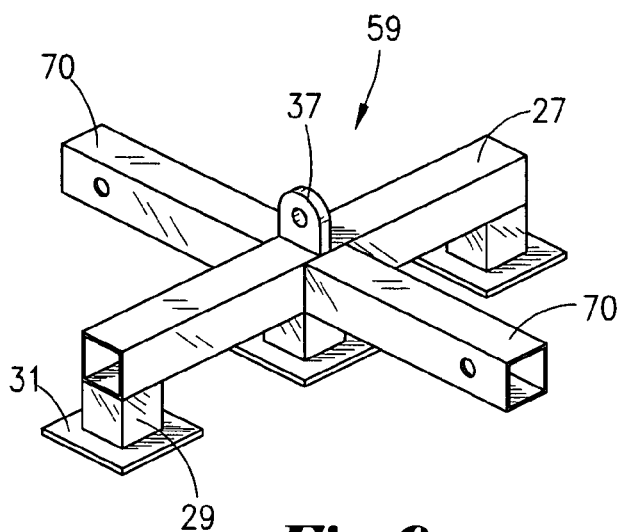
FIG. 9 is a partial isometric view of the central foot assembly.

The footing member 26, as shown in FIG. 5, includes a central horizontal bearing member 27 as shown in FIG. 9 usually constructed of square tubing, and a plurality of vertical frame legs or vertical columns 29 attached to the underside of the horizontal member 27, each having base plates 31 attached to their exposed ends and a pad eye vertically attached centrally to the upper or back of the horizontal member 27. When footing extension member assemblies are used for extended containers such as that shown in FIG. 8, or even longer containers, the apparatus 10 may be extended by adding multiples of the foot members 59,60,62, to the assembly. These footings are variations of the footing assembly 26 as shown in FIG. 5. The central foot assembly 59, as seen in FIG. 9 and as arranged in FIG. 12, further includes horizontal extension tube members 70 extending outwardly from the center of the horizontal member 27. An end footing assembly is formed by adding a single horizontal extension member 74, as shown in FIG. 11, to a footing assembly 26.

Figure 10:
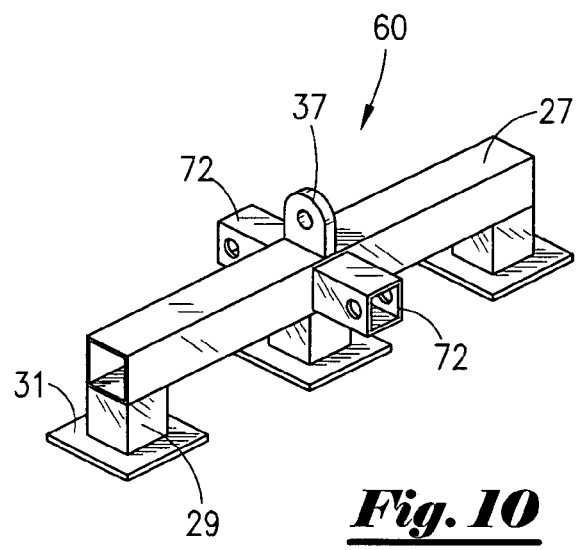
FIG. 10 is a partial isometric view of the adapter foot assembly.
Figure 12:
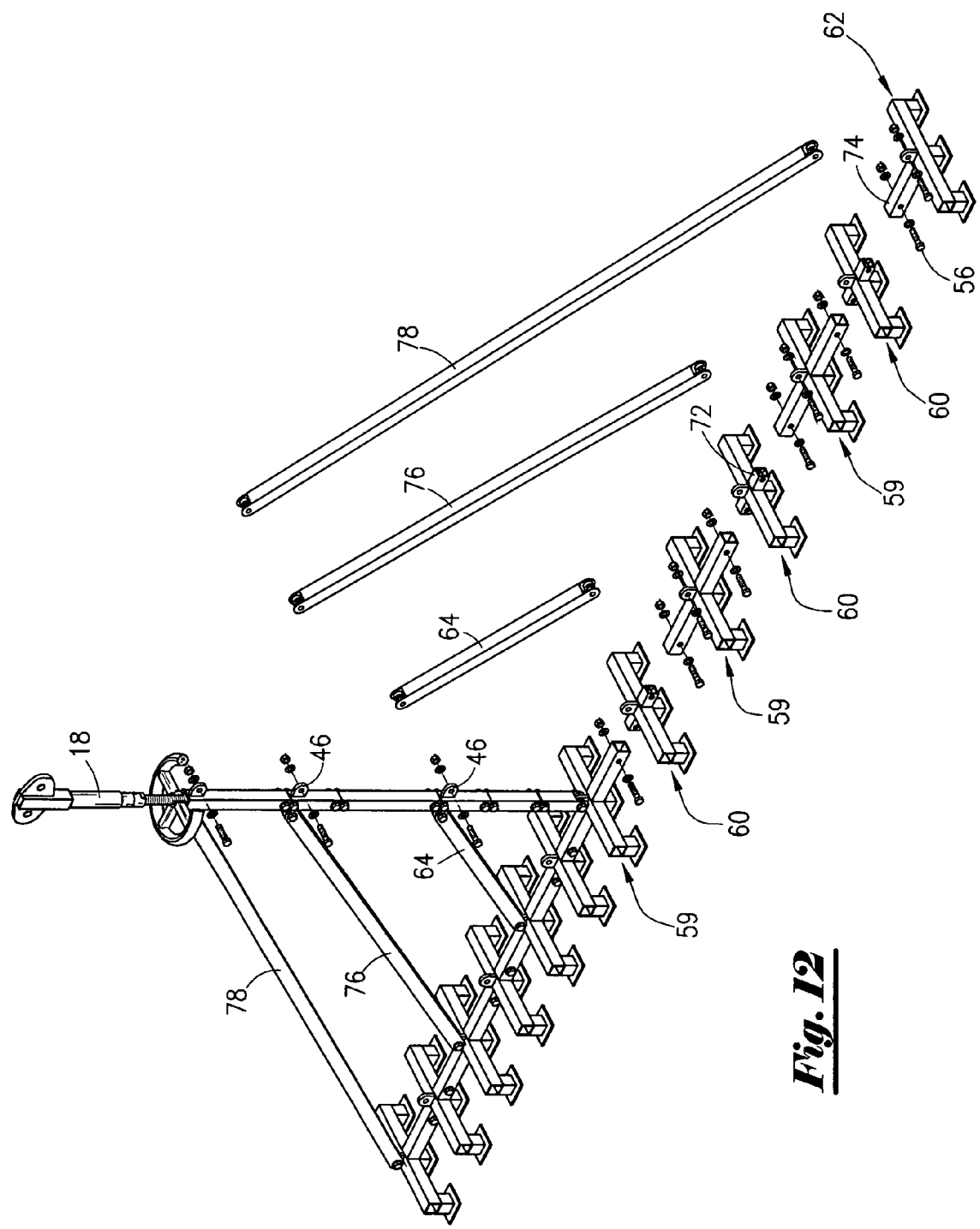
FIG. 12 is an isometric view of the apparatus utilizing multiple footing assemblies.

Another footing member 60 is modified as shown in FIG. 10 by adding horizontal tubular stub members 72 to a footing assembly 26 that are telescopically cooperative with horizontal members 70, 74 located on central and end foot assemblies 59, 62. As the assembly 10 grows relative to the length of the container 57 additional trusses or braces 76, 78 are required as shown in FIG. 12, attachable to the footing 59, 60, 62, and the column pad eyes 46 located as required to equally distribute the force being applied by the actuator 18 to the floor of the container and all of its framing via the slings 14 simultaneously. Again, fastener assemblies 59 consisting of bolts, nuts and washers or pin arrangement are used to connect the footing assembly, its brace members, and vertical column extension members.

Lifting container manufacturers are required to certify their containers according to established guidelines set out by the American Bureau of Shipping (ABS), the American Petroleum Institute (API), the Det Norske Veritas (DNV), and others. Such lifting containers and their rigging must be labeled identifying the manufacturer of the container, its Maximum Breaking Load (MBL), its Maximum Gross Mass (MGM), its maximum permissible working load or net weight, its Safe Working Load (SWL), the certifying authority, the date of the last certification, as well as other pertinent information. These periodic certifications are generally required every 6 years, following repairs to the structural members or at the discretion of the inspection authority. During such inspection and testing the container must be subjected to 2.5 times the MGM over four lifting points and 1.5 times the MGM over two lifting points. To achieve these stress levels a solid mass is generally placed within the container prior to being lifted. Applicant has found that this process does not provide a true representation of day-to-day stress imposed on the containers and actually provides structural support to the container's vertical and upper structural members during such test. Therefore, the instant test apparatus is advantageous in that loads are applied to the container's flooring and simultaneously to the container's structural members and its rigging in a somewhat uneven manner that more accurately represents the container's normal loading characteristics.

In operation the test assembly 10, as seen in FIG. 2, is placed within the confines of the container using wooden support beams 28 placed on the flooring of the container directly below each of the plates 31 of the footing assemblies 26, or 59, 60, 62, as seen in FIG. 7, in a manner whereby the load applied to the footing assemblies will be redistributed over a large area of the container floor. It should be noted that long wooden beams may be shaped having a greater cross section near their center point or be reinforced to reduce defection. In any case, as seen in FIG. 3, the load is applied to the floor 24 of the container 12 without supporting its vertical columns or upper container frame members.

The slings 14, which can be chains, web belts or cables, are then attached to the pad eyes 38 or similar connecting means attachable to the base or blind end of the actuator 18. The hand wheel 16 is then rotated, thereby extending the length of the threaded rod 48, as seen in FIG. 5, relative to the actuator 18 and the vertical column assembly 32 thus applying tension to the slings 14. It should be noted that it is anticipated that other means of tensioning the slings 14 or compensating for warped containers may be used, such as coupling small screw jacks or belt ratchet jacks inline with the slings 14, in which case the vertical column assembly 32, threaded rod 48, and hand wheel 16 serving as a jacking screw for extending the length of the column assembly 32 would be redundant. Once tension is applied to the slings 14, pressure is then applied to the linear actuator 18 via lines 20 connected to a pressure source, thus applying a load to the footing assemblies as seen in FIG. 1.

It is desirable to establish the force being applied by the actuator 18 to the footing member assemblies 26, 59, 60, 62 under controlled test conditions using load sensors at strategic points for each size container to be subjected to structural stress. Thereafter, field tests can be correlated to specific pressure applications. This pretest may be necessary due to variations in construction between manufacturers and their designated safe working loads. Testing the containers in this manner does not require the use of a crane to lift the containers containing the required stress loads.

Figure 13:
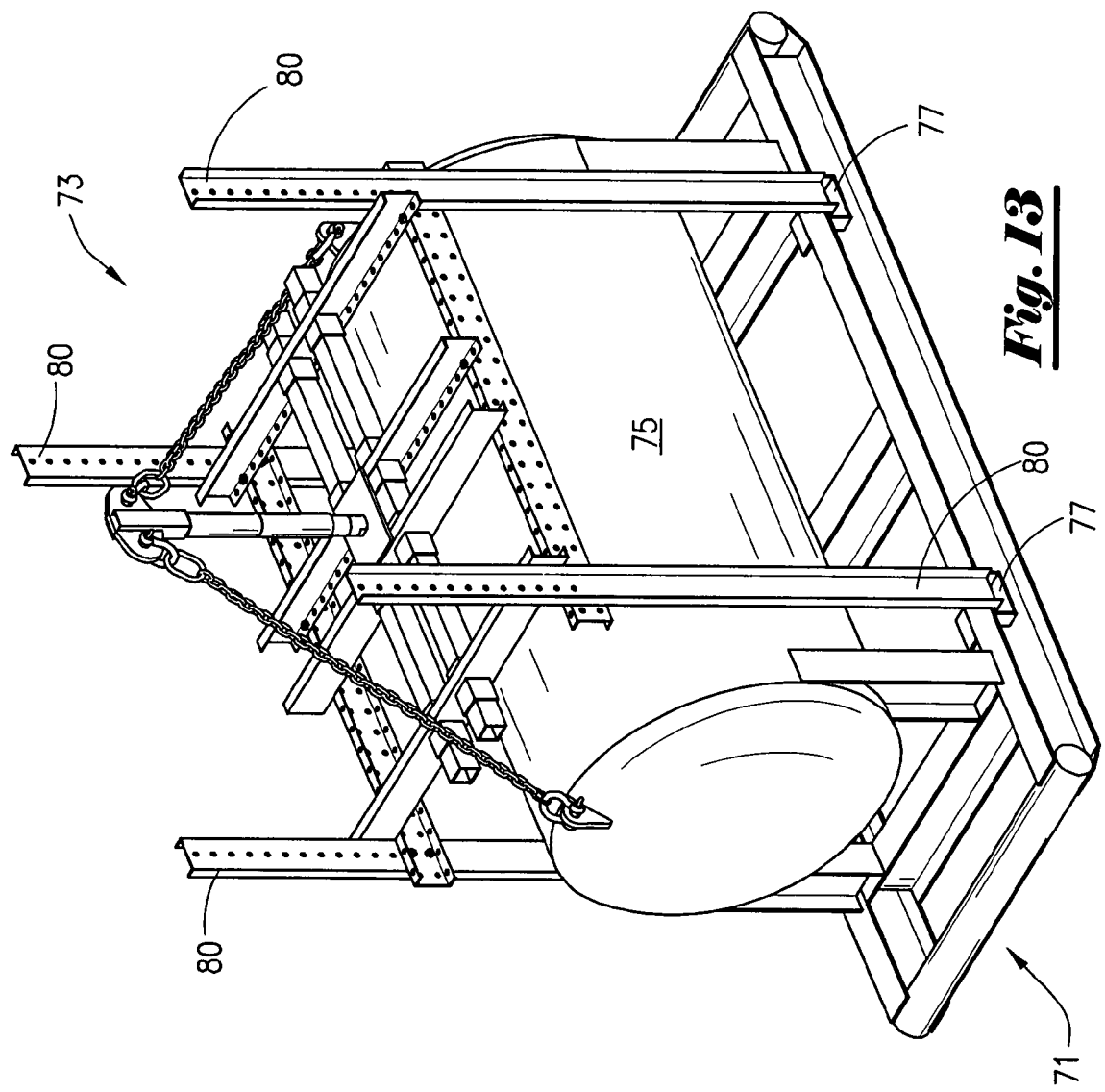
FIG. 13 is an isometric view of a second embodiment of the test apparatus as used for skids.

As first seen in FIG. 13, the isometric test apparatus may be adapted for use in testing the structural integrity of skid mounted equipment such as tanks, generators, pump systems and various other test units that must be lifted from work boats to the decks of offshore drilling rigs.

Figure 14:
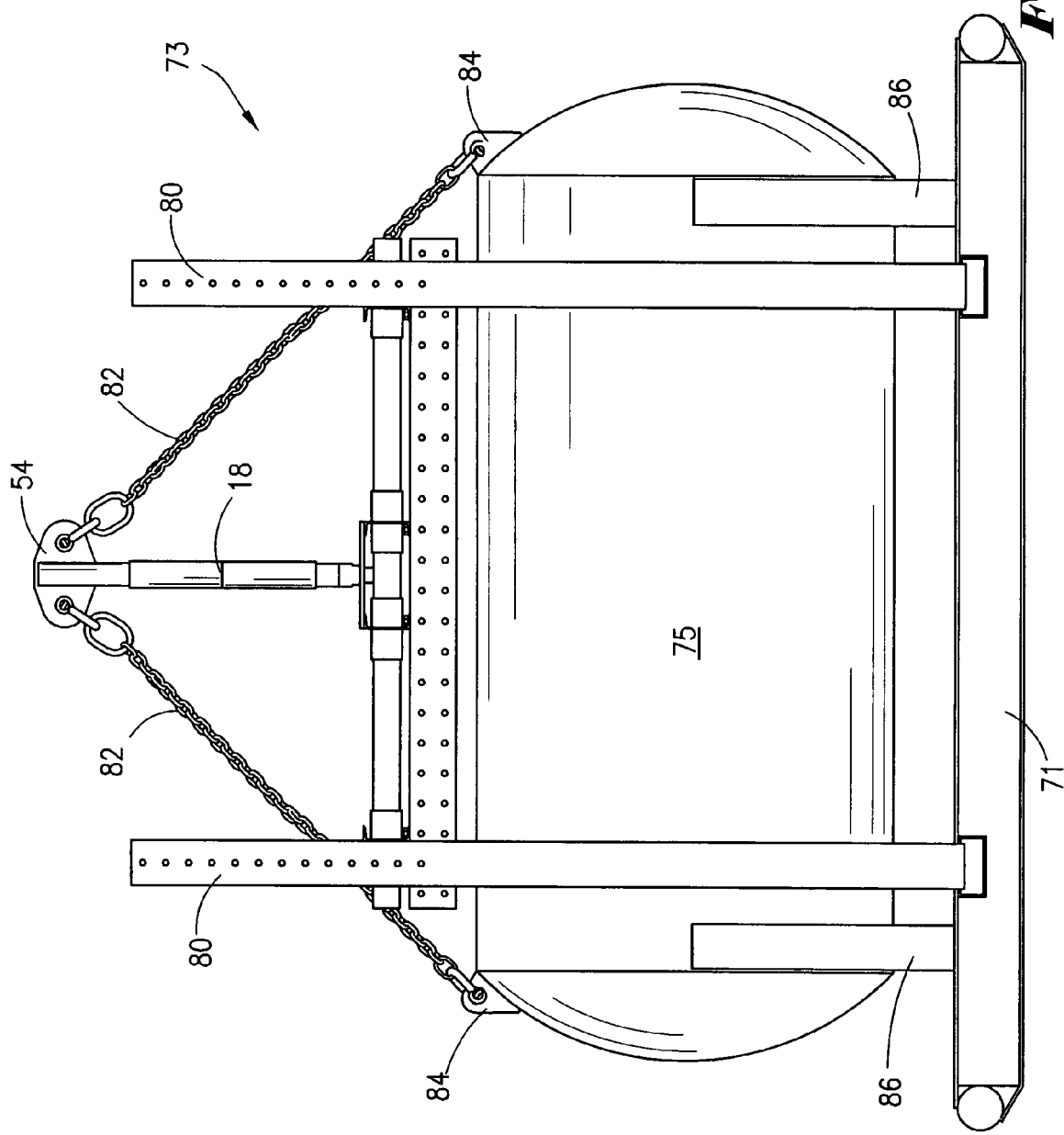
FIG. 14 is a side elevation view of the embodiment shown in FIG. 13.
Figure 15:
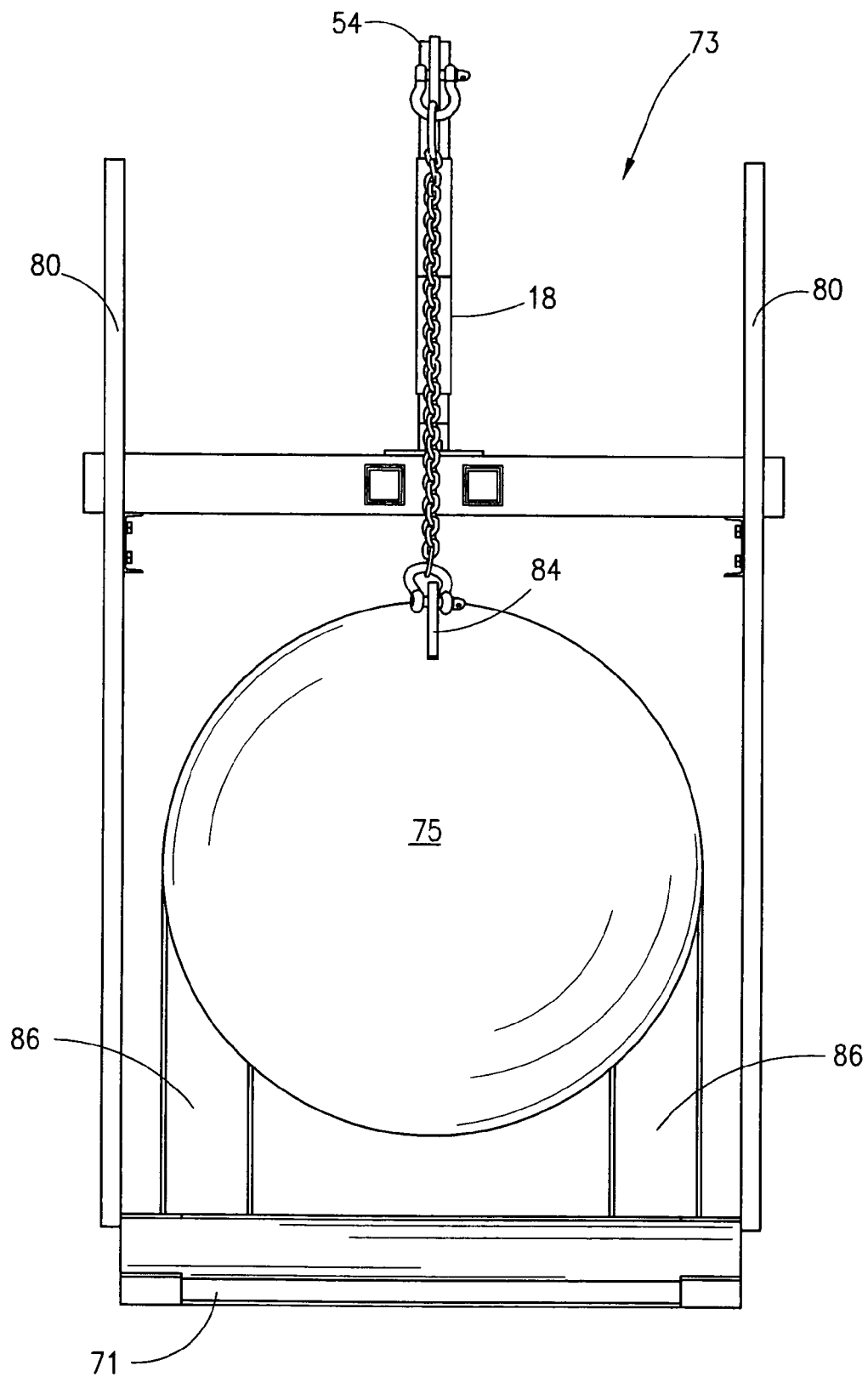
FIG. 15 is an end view of the embodiment shown in FIG. 13.

As shown in FIG. 13 tank skids 71 may be quite large and capable of transporting tanks 75 containing hundreds of gallons of fluids, thus the skid frame as well as the lifting eyes or points must be tested periodically for structural integrity. The skids 71 are usually provided with slots or openings for inserting the tines of a forklift when lifting and transporting the skid units on land. These slots or openings are utilized to mount the skid test apparatus assembly or platform assembly or platform assembly 73 to the skid by inserting the foot portion 77 of each of the frame legs or vertical columns 80 into the skid slots or openings. The framing of the skid test apparatus assembly or platform assembly 73 is adjustable longitudinally and vertically to accommodate a wide variety of skid sizes as illustrated in FIG. 15. As in the previously discussed test apparatus, the hydraulic linear actuator assembly 18 and its head assembly 54, as better shown in FIG. 14, is utilized to apply tension loading to the flexible or chain slings 82 connected by to the head assembly 54 and the lifting eyes or points 84 attached to the tank 75.

As seen in FIG. 15, applying tension to the lifting eyes or points 84 by applying hydraulic pressure via a hydraulic pump to the linear actuator 18 attempts to lift the tank 75 while exerting downward force to the test apparatus assembly 73 via frame legs or vertical columns 80 to the skid 71 in an opposing manner, thereby effectively testing the structural integrity of the skid and the support members 86.

Figure 16:
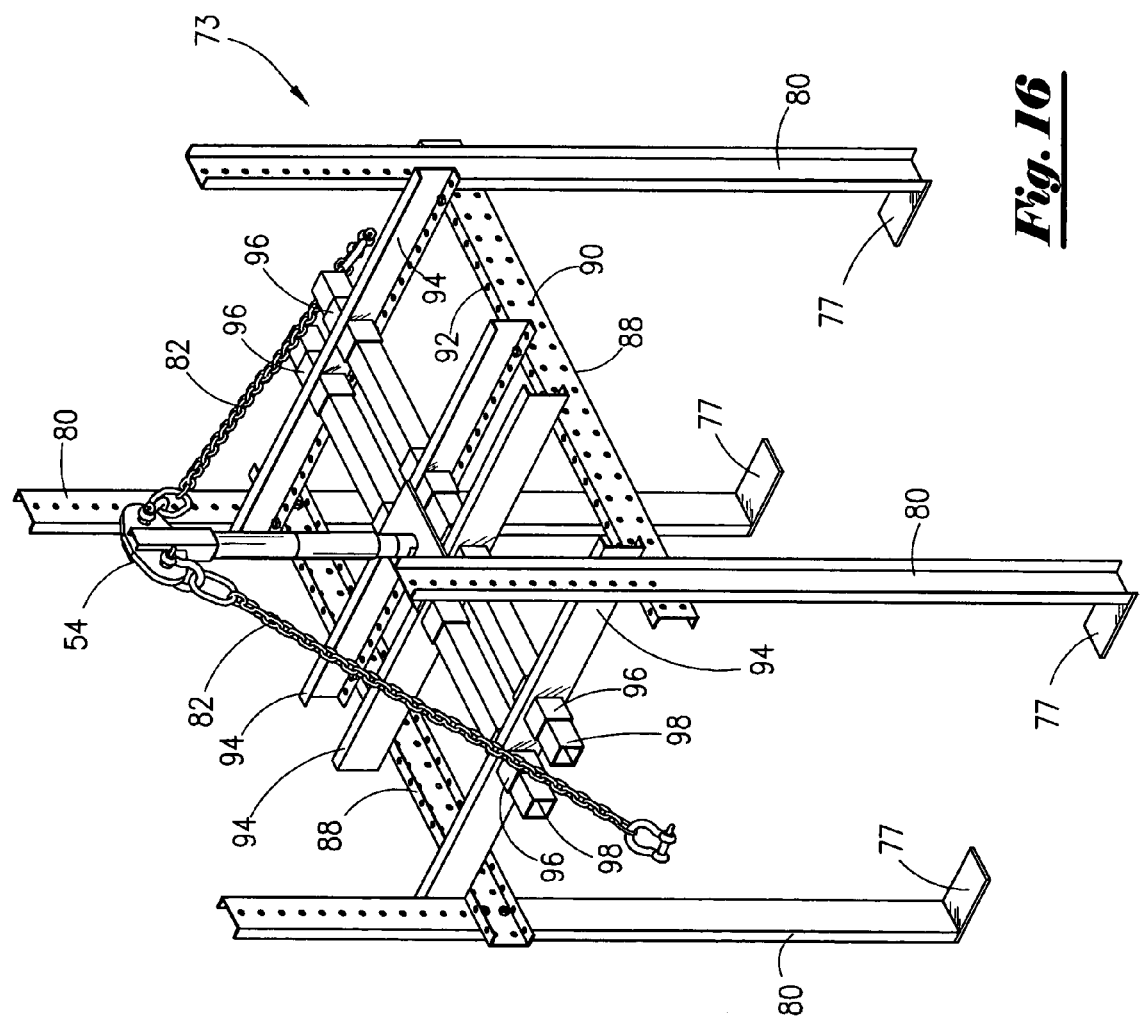
FIG. 16 is an isometric view of the skid test apparatus.

Although many suitable frame assembly maybe utilized to achieve the function described herein, one such assembly may be used as depicted in FIG. 16. The skid test assembly 73 in this case may include a fully adjustable frame composed of longitudinal beams or members 88 for connecting the frame legs or vertical columns 80. These beams 88 have holes 90 drilled incrementally along their length to allow the frame legs or vertical columns 80 to be spaced apart with fasteners to accommodate the fork lift slots or openings in various skid assemblies. The frame legs or vertical columns 80 have fastener holes located incrementally along their length to allow the adjustable support beams 88 to be positioned vertically relative to the feet 77. The adjustable support beams 88 may also be provided with spaced holes 92 along their upper flange for connecting support cross members 94. The cross members 94 provide support for the hydraulic actuator 18 head assembly 54 and slings 82. The cross members or beams 94 are also fitted with sleeves 96 to accommodate a set of longitudinal tubular members 98 slidable through the sleeves 96 of all of the adjustable cross members 94. The linear actuator 18 may be supported at one end and centrally positioned at the intersection of beams 94 and tubular members 98 or at any point along tubular members 98. However, a plurality of linear actuators may straddle the beams 94 and supported by tubular members 98 if desired. The cross member's beams 94 are adjustable by having attachment holes drilled along their lower flange to provide connection to the longitudinal beams or members 88 in an incremental manner, thereby allowing horizontal adjustment. It is fully anticipated that other means of structural assembly may be used, such as rectangular box or round tubing with external sleeves slidable along such tubing members for adjustment without drilling holes in the structural members for fasteners.

Figure 17:
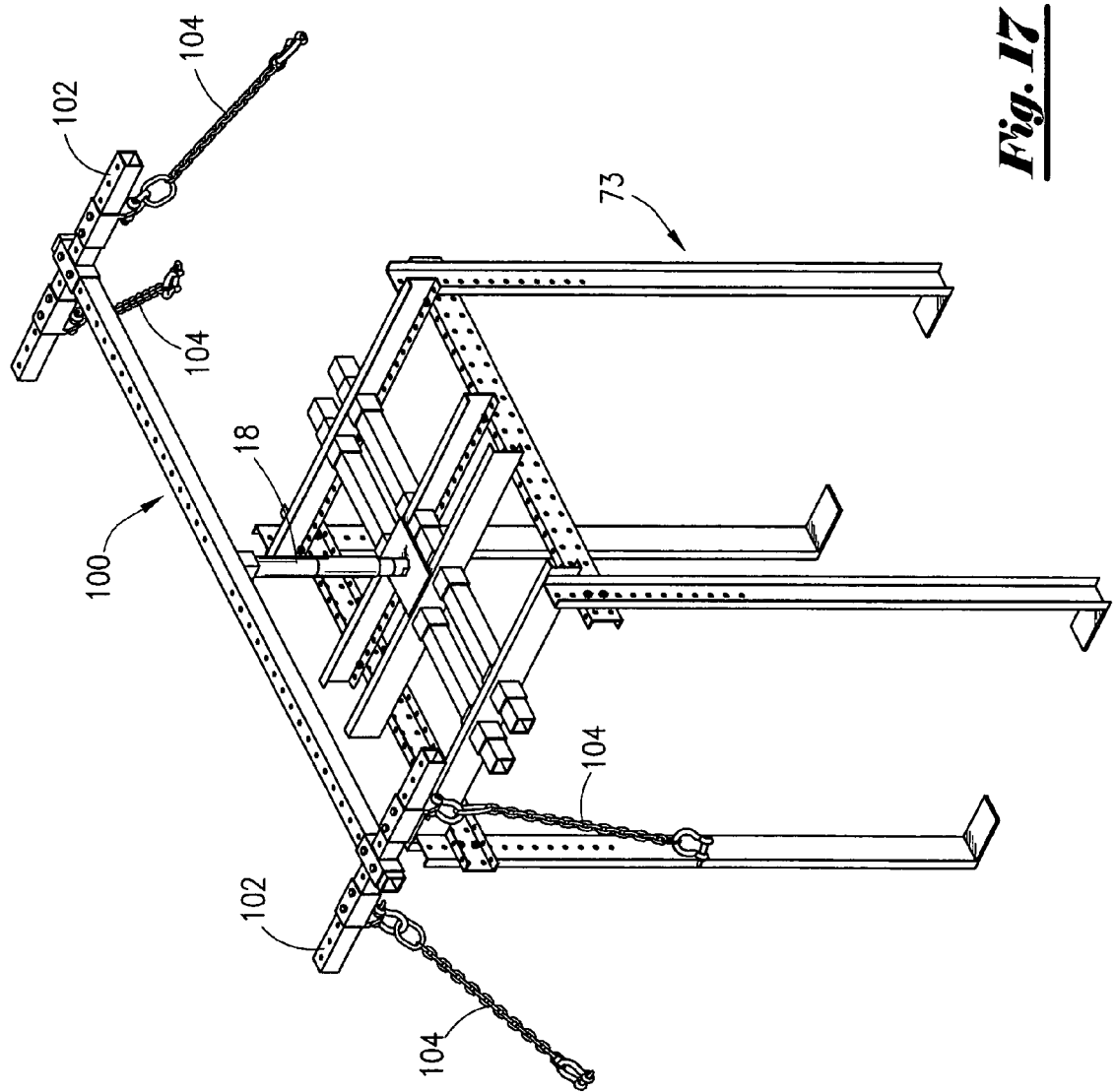
FIG. 17 is an isometric view of a third embodiment of the tensioning apparatus utilizing a spreader bar rigging as adapted for use with enclosed containers.

As seen in FIG. 17 other arrangements may be utilized to accommodate unusual skid arrangements including container skids with a plurality of lifting points or very long skids that may require a rigging utilizing a spreader bar or frame. In such cases the skid test apparatus assembly or platform assembly 73 seen in FIG. 17 is supplemented with a spreader bar or frame assembly 100 adapted to connect to the upper end of the linear actuator assembly 18.

The spreader bar or frame 100 may be configured as a longitudinal beam having sufficient cross section to sustain the applied test loading with cross members 102 at each end for adjustment in at least two axis as shown or simply a single beam. Flexible sling sets 104 may be adjustably attached to the cross members 102 or directly to the beam assembly 100.

Figure 18:
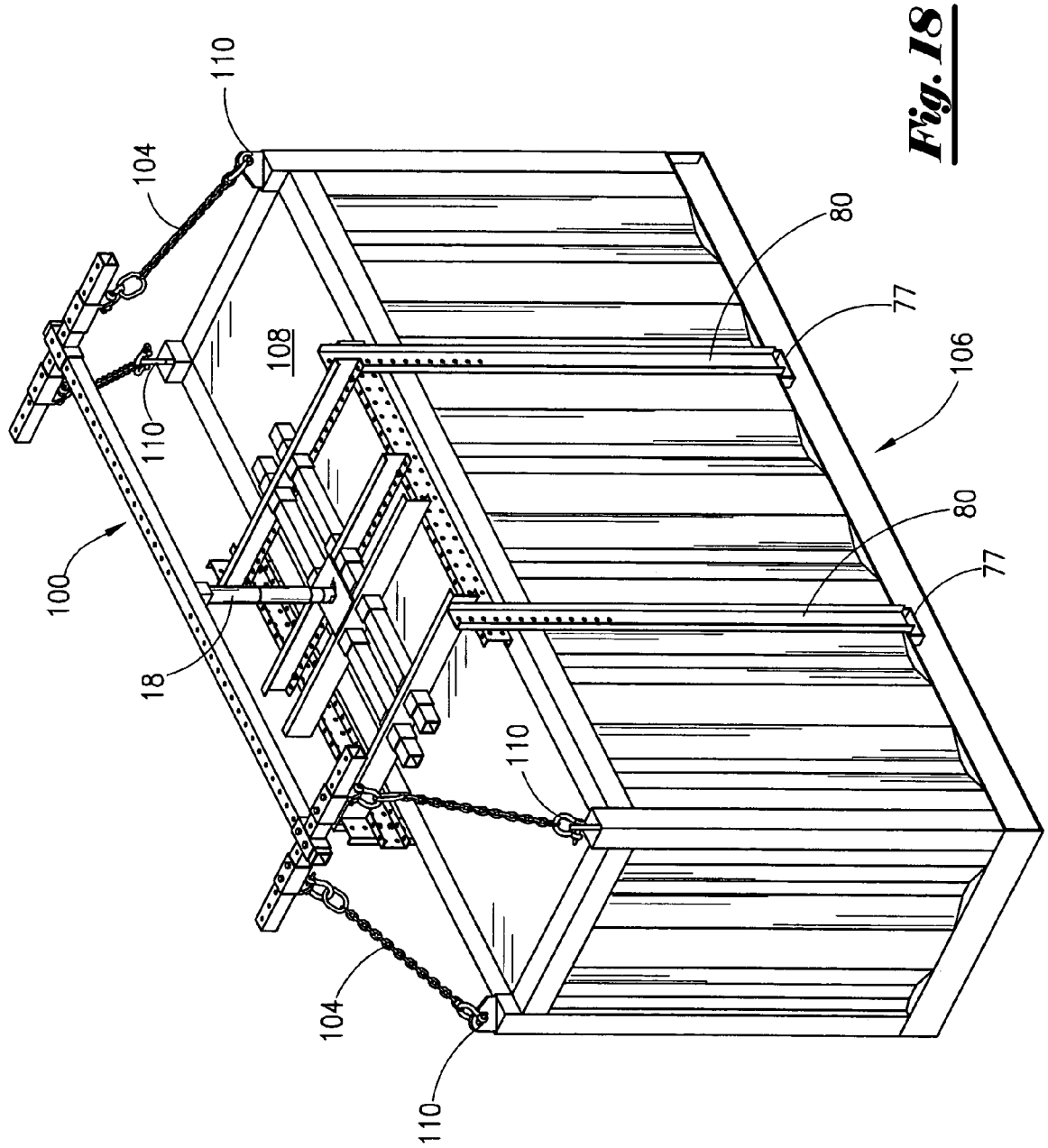
FIG. 18 is an isometric view of the third embodiment illustrated in FIG. 17.

As shown in FIG. 18, the spreader bar assembly 100 and the skid test apparatus assembly or platform assembly 73 is adjustably attached to the container skid 106 by inserting the feet 77 into the fork lift slots or openings generally provided in the container skid 106. The slings 104 are then attached to the container 108. By exerting an extending force on the actuator 18, tension is applied to the lifting eyes or points 110 and a force is applied to the skid 106 via the frame legs or vertical columns 80 in an opposing manner, thus determining the structural integrity of the container 104, the skid 106, and its lifting eyes or points 110. The arrangement may be used for any skid-mounted equipment, such as generators and the like, as well as personnel and special equipment lift boxes.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A stress test apparatus for certifying equipment skids for lifting by cranes in an offshore environment comprising:
   a) platform assembly;
   b) a plurality of vertical columns extending from said platform;
   c) at least one linear actuator attached to said platform opposite said vertical columns;
   d) a plurality of flexible slings, attachable to lifting points located on an equipment skid under test, attached to at least one said linear actuator; and
   e) a means for attaching said vertical columns to an equipment skid under test.

2. The stress test apparatus for certifying equipment skids for lifting by cranes in an offshore environment according to claim 1 wherein said stress test apparatus further comprises a spreader bar attached to said at least one linear actuator.

3. The stress test apparatus for certifying equipment skids for lifting by cranes in an offshore environment according to claim 1 wherein said means for attaching said vertical columns to an equipment skid under test comprises feet located at the base of said vertical columns cooperative with lifting openings located within said equipment skid.

4. The stress test apparatus for certifying equipment skids for lifting by cranes in an offshore environment according to claim 1 wherein said platform is adjustable in at least two axis.

5. The stress test apparatus for certifying equipment skids for lifting by cranes in an offshore environment according to claim 1 wherein said vertical columns are adjustable relative to said platform.

6. The stress test apparatus for certifying equipment skids for lifting by cranes in an offshore environment according to claim 1 wherein said linear actuator is a hydraulic ram.

7. The stress test apparatus for certifying equipment skids for lifting by cranes in an offshore environment according to claim 6 wherein said stress test apparatus further comprises a means for hydraulically extending said hydraulic ram.

8. The stress test apparatus for certifying equipment skids for lifting by cranes in an offshore environment according to claim 1 wherein said lifting points are pad eyes attached to equipment supported by said equipment skid.

9. The stress test apparatus for certifying equipment skids for lifting by cranes in an offshore environment according to claim 1 wherein said lifting points are pad eyes integral to structural members of said equipment skid.

10. A stress test apparatus for certifying equipment skids for lifting by cranes in an offshore environment comprising:
    a) a structural frame assembly having a plurality of intersecting adjustable beam members;
    b) a plurality of rigid leg members attached to the structural frame assembly each leg member having a foot member attached at one end, the foot member being cooperative with slots or openings generally found in portable equipment skids;
    c) at least one linear actuator supported by the structural frame assembly; and
    d) a rigging attachable to at least one linear actuator for attachment to lifting points generally provided for lifting portable equipment skids.

11. The test apparatus according to claim 10 wherein the structural frame is extendable.

12. The test apparatus according to claim 10 wherein the frame legs or vertical columns are adjustable relative to the frame.

13. The test apparatus according to claim 10 wherein the structural frame assembly is located above the equipment skid and supported by the frame legs or vertical columns engaging the equipment skid.

14. The test apparatus according to claim 10 wherein the at least one linear actuator further comprises a base plate for connecting at least one of the linear actuators to the structural frame assembly.

15. The test apparatus according to claim 10 further comprising a means for extending at least one linear actuator.

16. The test apparatus according to claim 15 wherein the means for extending at least one linear actuator is a hydraulic pump.

17. The test apparatus according to claim 15 wherein the means for extending at least one linear actuator is a jack screw.

18. The test apparatus according to claim 15 wherein the means for extending at least one linear actuator is an extension member.

19. The test apparatus according to claim 10 further comprising a means for centrally locating at least one linear actuator relative to the lifting points of the equipment skid.

20. A stress test apparatus for certifying equipment skids for lifting by cranes in an offshore environment according to claim 10 wherein said structural frame assembly comprises:
    a) a first longitudinal member having means for incrementally connecting at least two vertical leg members along its length;
    b) a second longitudinal member having means for incrementally connecting at least two vertical leg members along its length;
    c) a plurality of leg members having means for incremental adjustment connected to the first and second longitudinal members;
    d) a plurality of cross members connecting the first and second longitudinal members in a spaced apart manner the cross members being incrementally adjustable relative to the longitudinal members each said cross member having sleeves therein; and
    e) at least one tubular member slidable through the sleeves of at least two of the cross members.

21. The test apparatus according to claim 10 wherein the foot members are arranged in an opposing manner when the frame legs or vertical columns are attached to the frame structure.

22. The test apparatus according to claim 10 wherein said rigging attached to at least one linear actuator is a spreader bar.

23. The test apparatus according to claim 10 wherein said rigging attached to at least one linear actuator is a spreader frame assembly.

24. The test apparatus according to claim 23 wherein said rigging attached to at least one linear actuator further comprises adjustment in at least two axis.

25. The test apparatus according to claim 23 wherein said rigging attached to at least one linear actuator further comprises at least one sling set for attachment to a skid mounted container.

26. The test apparatus according to claim 23 wherein said rigging attached to at least one linear actuator is connected to lifting points of a container under test in an opposing manner relative to said structural frame assembly.

* * * * *